(12) United States Patent　　(10) Patent No.: US 10,667,108 B2
Inoue　　(45) Date of Patent: *May 26, 2020

(54) PRINTING APPARATUS CONFIGURED TO TRANSMIT BLUETOOTH® LOW ENERGY ADVERTISE PACKET

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/122,590

(22) Filed: Sep. 5, 2018

(65) Prior Publication Data

US 2019/0007818 A1　　Jan. 3, 2019

Related U.S. Application Data

(63) Continuation of application No. 15/462,148, filed on Mar. 17, 2017, now Pat. No. 10,111,074.

(30) Foreign Application Priority Data

Mar. 24, 2016　(JP) ................................ 2016-060644

(51) Int. Cl.
*H04W 4/80*　　(2018.01)
*H04W 4/06*　　(2009.01)
*H04W 4/50*　　(2018.01)

(52) U.S. Cl.
CPC ............... *H04W 4/80* (2018.02); *H04W 4/06* (2013.01); *H04W 4/50* (2018.02)

(58) Field of Classification Search
CPC ............ H04W 4/80; H04W 4/50; H04W 4/06
USPC ...... 455/41.1, 41.2, 41.3, 552.1, 556.1, 557; 370/312; 358/1.15
See application file for complete search history.

(56) References Cited

U.S. PATENT DOCUMENTS

| | | | |
|---|---|---|---|
| 10,111,074 B2* | 10/2018 | Inoue | H04W 4/50 |
| 2004/0250264 A1* | 12/2004 | Kato | G06F 9/4411 719/321 |
| 2012/0257561 A1* | 10/2012 | Redding | H04L 12/1827 370/312 |
| 2016/0234301 A1* | 8/2016 | Qi | H04W 8/005 |
| 2016/0241728 A1* | 8/2016 | Naruse | H04N 1/00347 |
| 2016/0269577 A1* | 9/2016 | Sato | H04N 1/00307 |
| 2016/0278006 A1* | 9/2016 | Lee | H04W 76/10 |
| 2016/0378410 A1* | 12/2016 | Inoue | G06F 3/1236 358/1.15 |
| 2017/0013153 A1* | 1/2017 | Shin | H04W 76/10 |
| 2017/0134227 A1* | 5/2017 | Song | H04L 1/1887 |
| 2017/0208428 A1* | 7/2017 | Lim | H04W 12/06 |
| 2017/0215113 A1* | 7/2017 | Lee | H04W 36/14 |

(Continued)

FOREIGN PATENT DOCUMENTS

| | | |
|---|---|---|
| CN | 102882637 A | 1/2013 |
| CN | 103781158 A | 5/2014 |

(Continued)

*Primary Examiner* — Tan H Trinh
(74) *Attorney, Agent, or Firm* — Canon U.S.A., Inc. IP Division (57) ABSTRACT

A user sets a format of an advertise packet to be transmitted from a plurality of formats using a setting screen displayed on a printing apparatus, and the printing apparatus transmits an advertise packet according to the setting made via the setting screen.

31 Claims, 9 Drawing Sheets

(56) References Cited

U.S. PATENT DOCUMENTS

| | | | |
|---|---|---|---|
| 2017/0223579 A1* | 8/2017 | Lee | H04W 48/14 |
| 2017/0223615 A1* | 8/2017 | Lee | H04W 48/14 |
| 2018/0220335 A1* | 8/2018 | Lee | H04W 52/0229 |

FOREIGN PATENT DOCUMENTS

| | | |
|---|---|---|
| CN | 105260850 A | 1/2016 |
| JP | 2005-210328 A | 8/2005 |
| JP | 2005-210382 A | 8/2005 |
| WO | 2015/042065 A1 | 3/2015 |

\* cited by examiner

```
┌─────────────────────────────────────────────────┐
│ ADVERTISE PACKET SETTINGS                       │
├─────────────────────────────────────────────────┤
│ SELECT TRANSMISSION FORMAT.                     │
│                        TRANSMISSION TRANSMISSION│
│                          INTERVAL      TIME     │
│   ● iBeacon              [ 100 ]msec [10000]msec│
│                                                 │
│   ● EddyStone            [ 150 ]msec [ 1500]msec│
│                                                 │
│   ○ PRINTING APPLICATION [     ]msec [     ]msec│
│                                                 │
│   ○ CUSTOM FORMAT        [     ]msec [     ]msec│
│                                                 │
│           [   OK   ]           [ RETURN ]       │
└─────────────────────────────────────────────────┘
                  SETTING SCREEN 700
```

PRINTING APPARATUS CONFIGURED TO TRANSMIT BLUETOOTH® LOW ENERGY ADVERTISE PACKET

CROSS REFERENCE TO RELATED APPLICATIONS

The present application is a continuation of U.S. patent application Ser. No. 15/462,148, filed on Mar. 17, 2017, which claims priority from Japanese Patent Application No. 2016-060644, filed Mar. 24, 2016, which is hereby incorporated by reference herein in its entirety.

BACKGROUND

Field

The present disclosure relates to a printing apparatus implementing a Bluetooth® Low Energy function.

Description of the Related Art

In recent years, a Bluetooth® Low Energy function has been increasingly implemented in various communication apparatuses such as smartphones, tablet terminals, digital cameras, and printing apparatuses. A communication apparatus including the Bluetooth® Low Energy function is configured to notify information to other devices including the Bluetooth® Low Energy function using advertise packets. The communication apparatus performs bidirectional communication with other devices using Bluetooth® Low Energy Generic Attribute Profile (GATT) communication. Japanese Patent Application Laid-Open No. 2016-025466 discusses a configuration in which whether a service can be provided using Bluetooth® Low Energy is communicated between a digital camera and a tablet personal computer (PC).

Various companies can define their own formats of Bluetooth® Low Energy advertise packets. For example, Apple® Inc. defines its format as iBeacon™ and Google® Inc. defines it's as Eddystone™.

Conventional communication apparatuses are configured to transmit advertise packets in one format. Thus, the conventional communication apparatuses are not applicable to an environment where advertise packets in a plurality of formats are required. For example, an environment where there are users who desire to use iBeacon™ and users who desire to use Eddystone™.

SUMMARY

According to an aspect of the present invention, a printing apparatus includes a printing unit, a wireless communication unit configured to transmit a Bluetooth® Low Energy advertise packet at a predetermined interval, and a display unit configured to display a setting screen via which, from a plurality of formats, a format of an advertise packet to be transmitted by the wireless communication unit is set, wherein the wireless communication unit transmits the advertise packet based on a setting made via the setting screen.

Further features will become apparent from the following description of exemplary embodiments with reference to the attached drawings.

DESCRIPTION OF THE EMBODIMENTS

An exemplary embodiment will be described below with reference to the drawings. It should be noted that the exemplary embodiment described below is not intended to be limiting, and that not every combination of features the below-described exemplary embodiment is always essential to the discussed technical solution.

Figure 1:
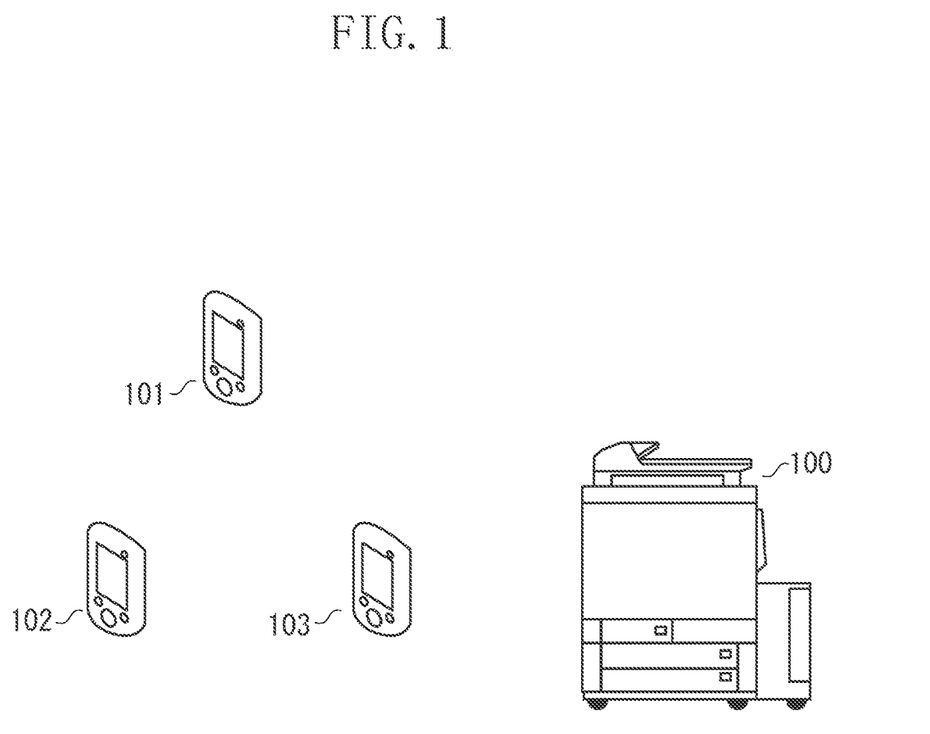
FIG. 1 illustrates a configuration of a communication system.

First, an overview of a communication system according to an exemplary embodiment will be described with reference to FIG. 1. The communication system according to the present exemplary embodiment includes a printing apparatus 100 and a plurality of mobile terminals 101, 102, and 103. The printing apparatus 100 and the mobile terminals 101, 102, and 103 each include a Bluetooth® Low Energy function. The printing apparatus 100 broadcasts an advertise packet at a predetermined interval. The mobile terminals 101, 102, and 103 receive the advertise packet. When the mobile terminals 101, 102, and 103 need to perform Bluetooth® Low Energy communication with the printing apparatus 100, the mobile terminals 101, 102, and 103 transmit a connection request to the printing apparatus 100 to change to Generic Attribute Profile (GATT) communication. The GATT communication realizes bidirectional communication between the printing apparatus 100 and the mobile terminals 101, 102, and 103. The printing apparatus 100 can transmit advertise packets in a plurality of formats. Details thereof will be described below Next, the hardware configuration of the printing apparatus 100 will be described below with reference to FIG. 2. The printing apparatus 100 is an example of a communication apparatus that includes the Bluetooth® Low Energy function. Any communication apparatus including the Bluetooth® Low Energy function, such as a smartphone, tablet terminal, or digital camera, can be used in place of the printing apparatus 100.

Figure 2:
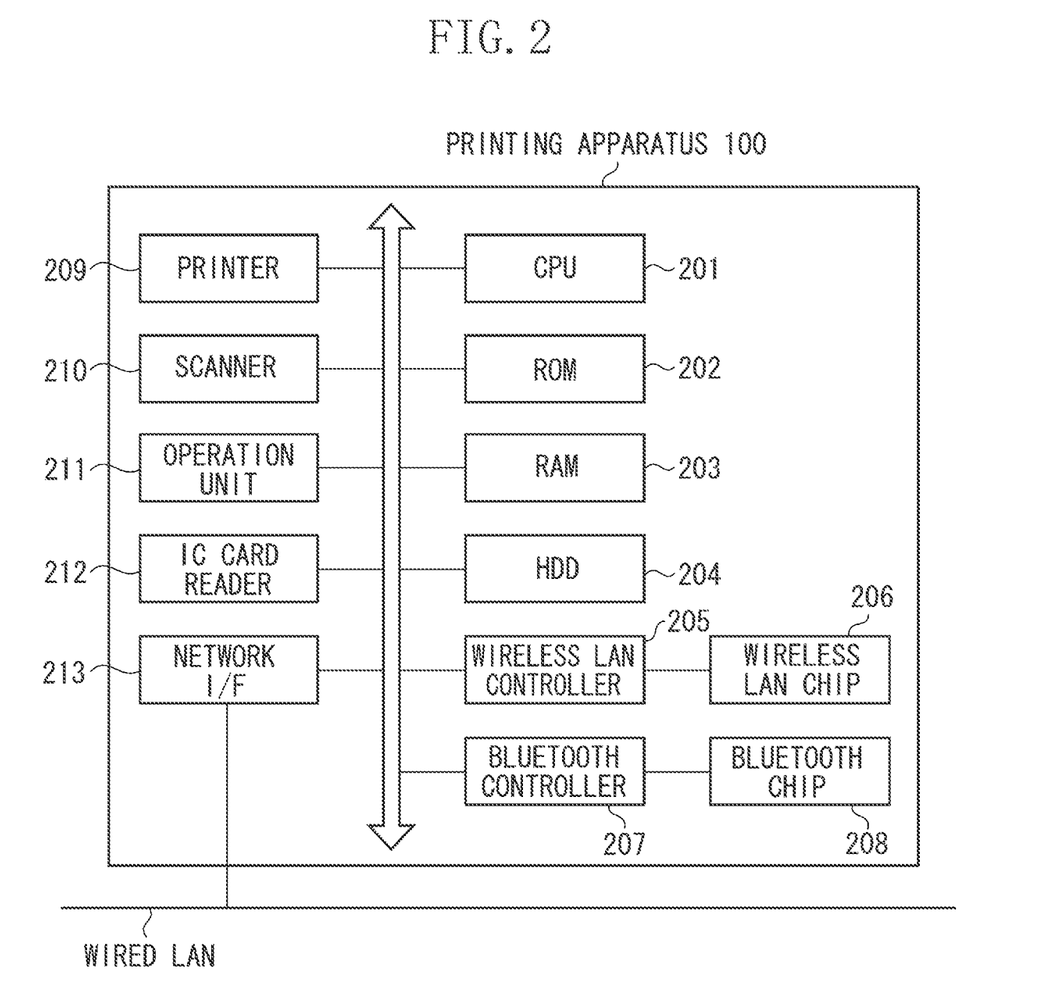
FIG. 2 illustrates a hardware configuration of a printing apparatus.

A central processing unit (CPU) 201 reads a control program stored in a read-only memory (ROM) 202 and executes various types of processing to control operations of the printing apparatus 100. A random access memory (RAM) 203 is used as a temporary storage area, for example, as a main memory of the CPU 201 or a work area. A hard disk drive (HDD) 204 is a non-volatile storage medium configured to store various types of data.

A printer 209 executes printing processing on a sheet based on print data received by a wireless local area network (LAN) chip 206 or a network interface (I/F) 213. A scanner 210 reads a document placed thereon and generates a document image. The document image generated by the scanner 210 is printed, i.e., copy processing, by the printer 209 or accumulated in the HDD 204.

An operation unit 211 includes a keyboard and a liquid crystal display unit implementing a touch panel function. The operation unit 211 displays various types of operation screens. A user can input instructions and information to the printing apparatus 100 via the operation unit 211. An integrated circuit (IC) card reader 212 reads user information from an IC card. The printing apparatus 100 executes authentication processing using the user information read by the IC card reader 212.

The wireless LAN chip 206 is a chip for performing wireless LAN communication, such as Institute of Electrical and Electronics Engineers (IEEE) 802.11a/b/g/n/ac communication. A wireless LAN controller 205 controls the wireless LAN communication performed by the wireless LAN chip 206. A Bluetooth® chip 208 is a wireless communication chip for performing Bluetooth® wireless communication. The Bluetooth® chip 208 also implements the Bluetooth® Low Energy function and broadcasts Bluetooth® Low Energy advertise packets at a predetermined interval. A Bluetooth® controller 207 controls the Bluetooth® communication and Bluetooth® Low Energy communication performed by the Bluetooth® chip 208. The network I/F 213 communicates with an external device (e.g., personal computer (PC)) on a wired LAN.

The printing apparatus 100 according to the present exemplary embodiment supports at least the following four formats of advertise packets: iBeacon™, Eddystone™, a printing application, and a custom format. The printing apparatus 100 transmits advertise packets in a format selected by a user from among the plurality of formats.

Figure 3:
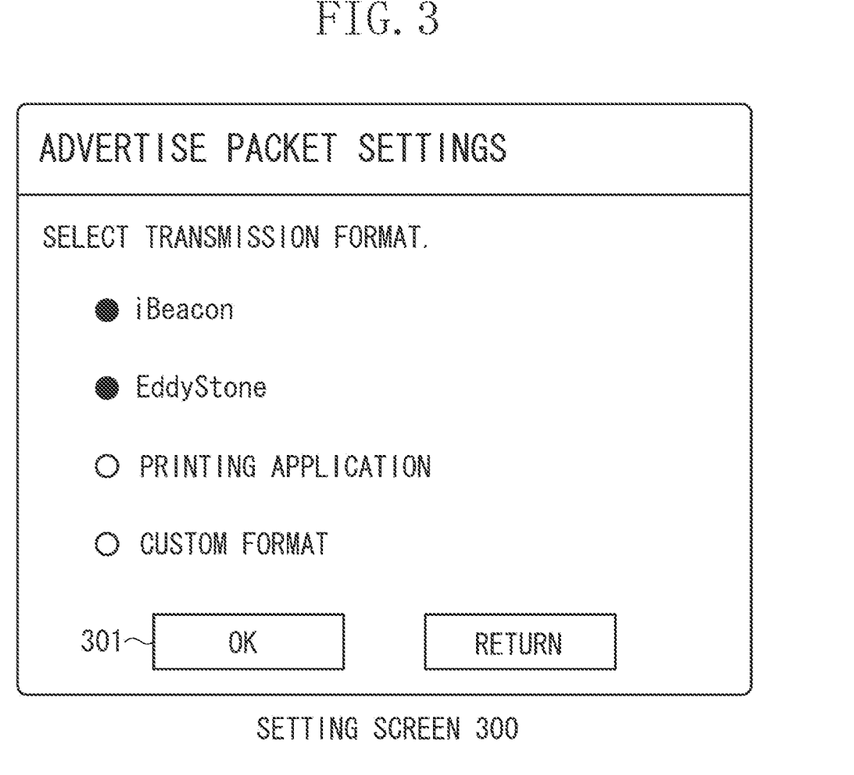
FIG. 3 illustrates a setting screen.

A user, e.g., system administrator, via a setting screen 300 illustrated in FIG. 3, selects, from the plurality of formats, a format of the advertise packet to be transmitted from the printing apparatus 100. In the present exemplary embodiment, the setting screen 300 displays the above-described four types of formats. The setting screen 300 illustrates an example in which iBeacon™ and Eddystone™ are selected. If the user selects a desired format and presses an OK button 301, the setting made via the setting screen 300 is stored as an advertise packet transmission setting in the HDD 204 of the printing apparatus 100. The operation unit 211 of the printing apparatus 100 displays the setting screen 300.

Next, iBeacon™, Eddystone™, the printing application, and the custom format will be described.

Figure 4A:
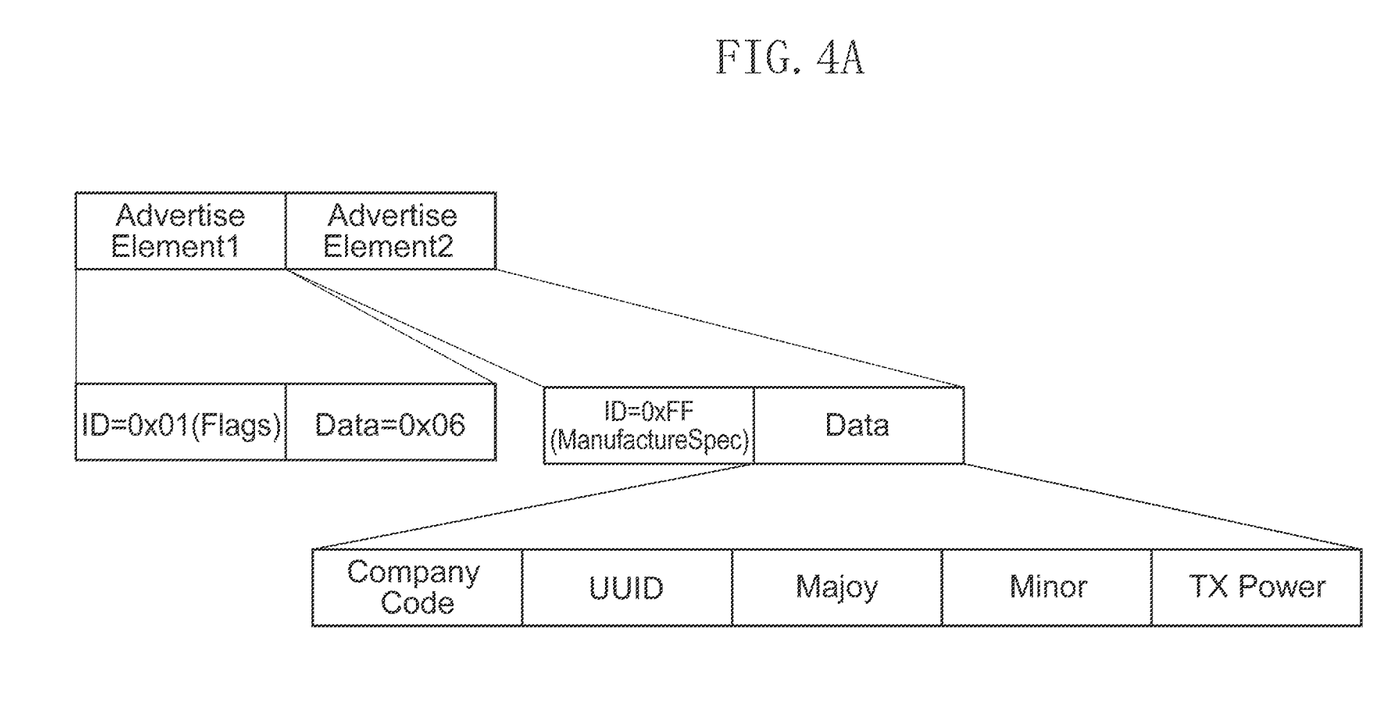
FIGS. 4A, 4B, and 4C each illustrate a data configuration of an advertise packet.

Advertise packets in iBeacon™ format are used by mobile terminals that support iBeacon™. FIG. 4A illustrates the data configuration of an advertise packet in iBeacon™ format. The advertise packet in iBeacon™ format stores a universally unique identifier (UUID), major value, minor value, and transmission power level value as its features.

Figure 4B:
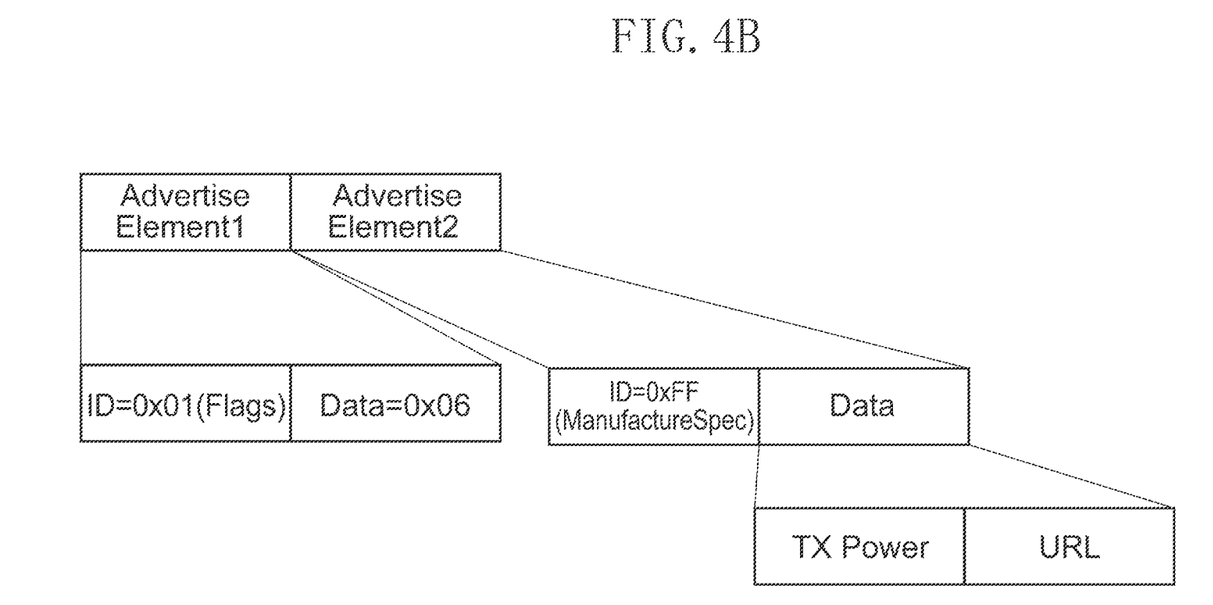

Advertise packets in Eddystone™ format are used by mobile terminals that support Eddystone™. FIG. 4B illustrates the data configuration of an advertise packet in Eddystone™ format. The advertise packet in Eddystone™ format is characterized by storing a transmission power level value and an arbitrary uniform resource locator (URL).

Figure 4C:
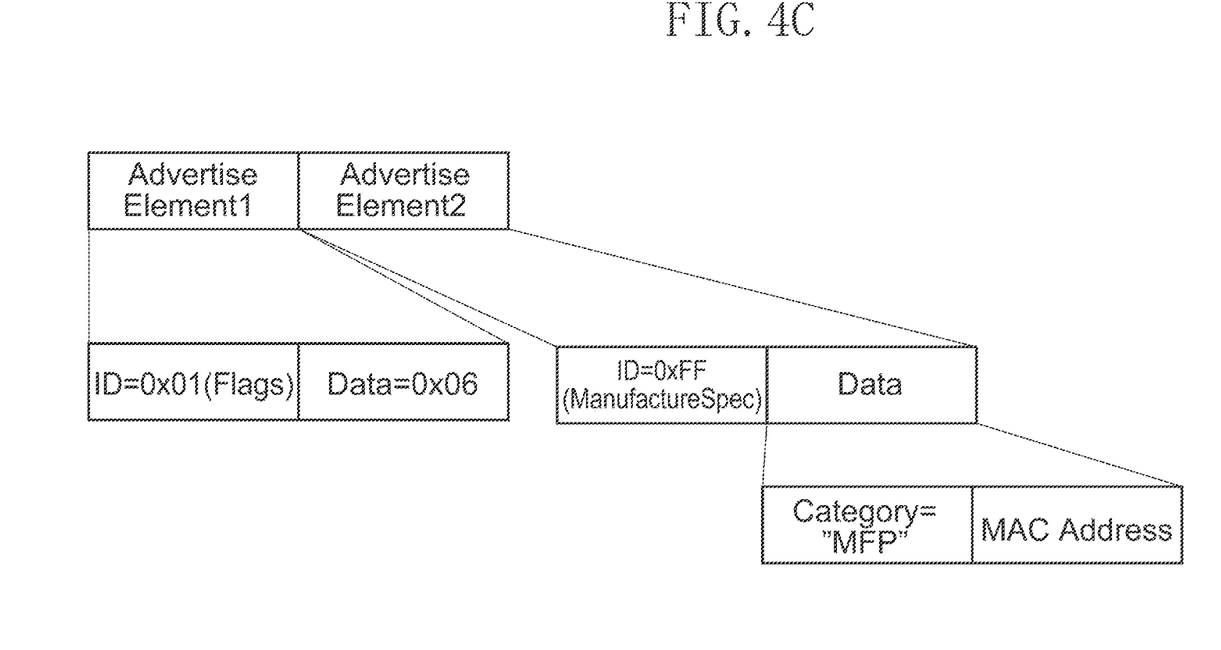

The printing application is an advertise packet format defined by the manufacturer of the printing apparatus 100. Advertise packets in printing application format are used by mobile terminals on which a specific application (e.g., application provided to users by the manufacturer of the printing apparatus 100) is installed. FIG. 4C illustrates the data configuration of an advertise packet in printing application format. The advertise packet in printing application format includes a device category and a media access control (MAC) address (MAC address of the printing apparatus 100 according to the present exemplary embodiment) as its feature.

The custom format is a format registered in the printing apparatus 100 by a user. In the present exemplary embodiment, if a user desires that the printing apparatus 100 transmits an advertise packet in a format different from iBeacon™, Eddystone™, and printing application, the user can register the desired format via a registration screen (not illustrated). The custom format is the setting that indicates that the registered format is used. Information about the format to be registered as the custom format can be imported into the printing apparatus 100 using a file transfer protocol (FTP) or near field communication (NFC).

As described above, since companies define their own Bluetooth® Low Energy advertise packet formats, the data configurations of advertise packets are different from each other.

Figure 5:
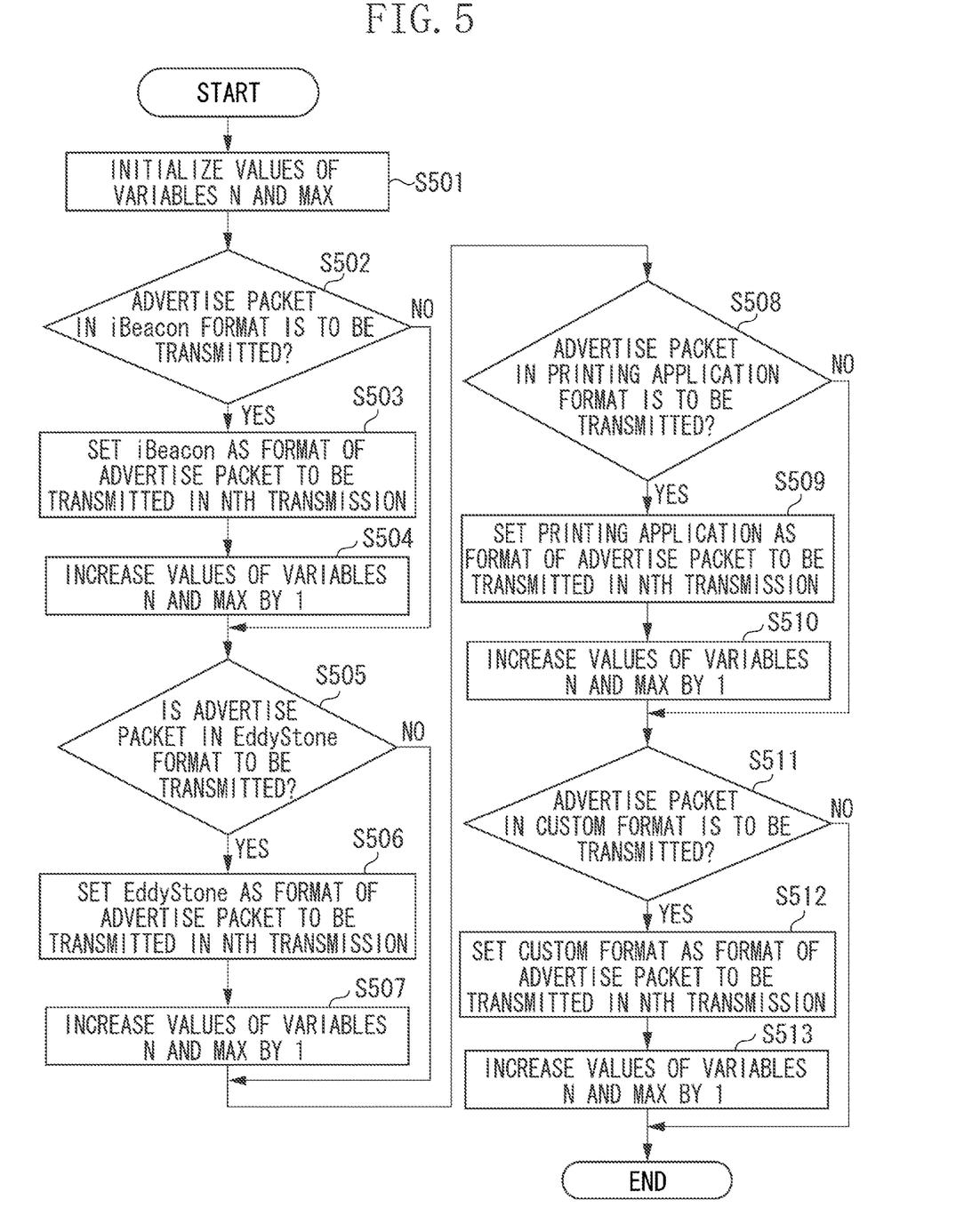
FIG. 5 is a flow chart illustrating a process which is executed by a printing apparatus.

Next, a process will be described, with reference to a flow chart illustrated in FIG. 5, in which the printing apparatus 100 selects a format of an advertise packet to be transmitted according to the setting made via the setting screen 300. The CPU 201 loads the control program stored in a memory such as the ROM 202, into the RAM 203 and executes the control program to perform the steps described in the flow chart illustrated in FIG. 5. The printing apparatus 100 can be configured such that the CPU 201 executes at least some of the steps described in the flow chart illustrated in FIG. 5 and another CPU (not illustrated) different from the CPU 201 executes the rest of the steps. The process illustrated in the flow chart in FIG. 5 is executed when the printing apparatus 100 is activated or when the OK button 301 on the setting screen 300 is pressed by a user.

First, in step S501, the CPU 201 initializes values of variables N and MAX. In the present exemplary embodiment, the CPU 201 initializes the value of variable N to one and the value of variable MAX to zero.

Next, in step S502, the CPU 201 determines whether the advertise packet in iBeacon™ format is to be transmitted. If the advertise packet in iBeacon™ format is to be transmitted according to the setting made via the setting screen 300 (YES in step S502), the processing proceeds to step S503. If the advertise packet in iBeacon™ format is not to be transmitted according to the setting made via the setting screen 300 (NO in step S502), the processing proceeds to step S505.

In step S503, the CPU 201 sets iBeacon™ as the Nth (N is the value of variable N) format to be transmitted. Next, in step S504, the CPU 201 increases each of the variables N and MAX by one.

In step S505, the CPU 201 determines whether the advertise packet in Eddystone™ format is to be transmitted. If the advertise packet in Eddystone™ format is to be transmitted according to the setting made via the setting screen 300 (YES in step S505), the processing proceeds to step S506. If the advertise packet in Eddystone™ format is not to be transmitted according to the setting made via the setting screen 300 (NO in step S505), the processing proceeds to step S508.

In step S506, the CPU 201 sets Eddystone™ as the Nth (N is the value of variable N) format to be transmitted. Then, in step S507, the CPU 201 increases each of the variables N and MAX by one.

In step S508, the CPU 201 determines whether an advertise packet in printing application format is to be transmitted. If an advertise packet in printing application format is to be transmitted according to the setting made via the setting screen 300 (YES in step S508), the processing proceeds to step S509. If an advertise packet in printing application format is not to be transmitted according to the setting set via the setting screen 300 (NO in step S508), the processing proceeds to step S511.

In step S509, the CPU 201 sets the printing application format as the Nth (N is the value of variable N) format to transmit. Next, in step S510, the CPU 201 increases each of variables N and MAX by one.

In step S511, the CPU 201 determines whether an advertise packet in custom format is to be transmitted. If the advertise packet in custom format is to be transmitted according to the setting made via the setting screen 300 (YES in step S511), the processing proceeds to step S512. If the advertise packet in custom format is not to be transmitted according to the setting made via the setting screen 300 (NO in step S511), the process illustrated in the flow chart ends.

In step S512, the CPU 201 sets the custom format as the Nth (N is the value of variable N) format to be transmitted. Then, in step S513, the CPU 201 increases each of variables N and MAX by one.

By performing the process illustrated in the flow chart in FIG. 5, the printing apparatus 100 can select a format of an advertise packet to be transmitted according to the setting made via the setting screen 300.

Next, a process will be described, with reference to a flow chart illustrated in FIG. 6, that is executed when the printing apparatus 100 transmits the advertise packets. The CPU 201 loads the control program stored in a memory such as the ROM 202 into the RAM 203 and executes the control program to perform the steps specified in the flow chart illustrated in FIG. 6. The printing apparatus 100 can be configured such that the CPU 201 executes some of the steps specified in the flow chart illustrated in FIG. 5 and another CPU (not illustrated) different from the CPU 201 executes the rest of the steps.

First, in step S601, the CPU 201 initializes a value of variable M. In the present exemplary embodiment, the CPU 201 initializes the value of variable M to one.

Next, in step S602, the CPU 201 starts transmission of an advertise packet set as the Mth (M is the value of variable M) advertise packet. The CPU 201 instructs the Bluetooth® controller 207 to start transmission of the advertise packet set as the Mth advertise packet. Then, according to the control by the Bluetooth® controller 207, the Bluetooth® chip 208 starts transmission of the advertise packet set as the Mth advertise packet. The Bluetooth® chip 208 periodically transmits the advertise packet at a predetermined time interval (e.g., interval of 100 msec).

Next, in step S603, the CPU 201 determines whether a predetermined time (e.g., 1000 msec) has elapsed after the start of the transmission of the advertise packet set as the Mth advertise packet. Until the predetermined time elapses after the start of the transmission of the advertise packet set as the Mth advertise packet, the Bluetooth® chip 208 repeats transmission of the advertise packet set as the Mth advertise packet at the predetermined time interval. If the predetermined time has elapsed after the start of the transmission of the advertise packet set as the Mth advertise packet (YES in step S603), the processing proceeds to step S604. If the predetermined time has not elapsed after the start of the transmission of the advertise packet set as the Mth advertise packet (NO in step S603), the CPU 201 stands by until the predetermined time elapses.

In step S604, the CPU 201 stops transmission of the advertise packet set as the Mth (M is the value of variable M) advertise packet. The CPU 201 instructs the Bluetooth® controller 207 to stop transmission of the advertise packet set as the Mth advertise packet. Then, according to the control by the Bluetooth® controller 207, the Bluetooth® chip 208 stops transmission of the advertise packet set as the Mth advertise packet.

Next, in step S605, the CPU 201 determines whether the value of variable M is equal to the value of variable MAX. If the value of variable M is not equal to the value of variable MAX (NO in step S605), the processing proceeds to step S606. In step S606, the CPU 201 increases the value of variable M by one, and the processing returns to step S602. In step S602, the CPU 201 starts transmission of an advertise packet set as the Mth (M is the value of variable M) advertise packet. That is, the CPU 201 starts transmission of the advertise packet in the next format.

In step S605, if the value of variable M is equal to the value of variable MAX (YES in step S605), the processing returns to step S601, and the CPU 201 initializes the value of variable M. Then, in step S602, the CPU 201 starts transmission of an advertise packet set as the Mth (M is the value of variable M) advertise packet. In other words, the CPU 201 starts transmission of the advertise packet in a format set as the first format.

Figure 6:
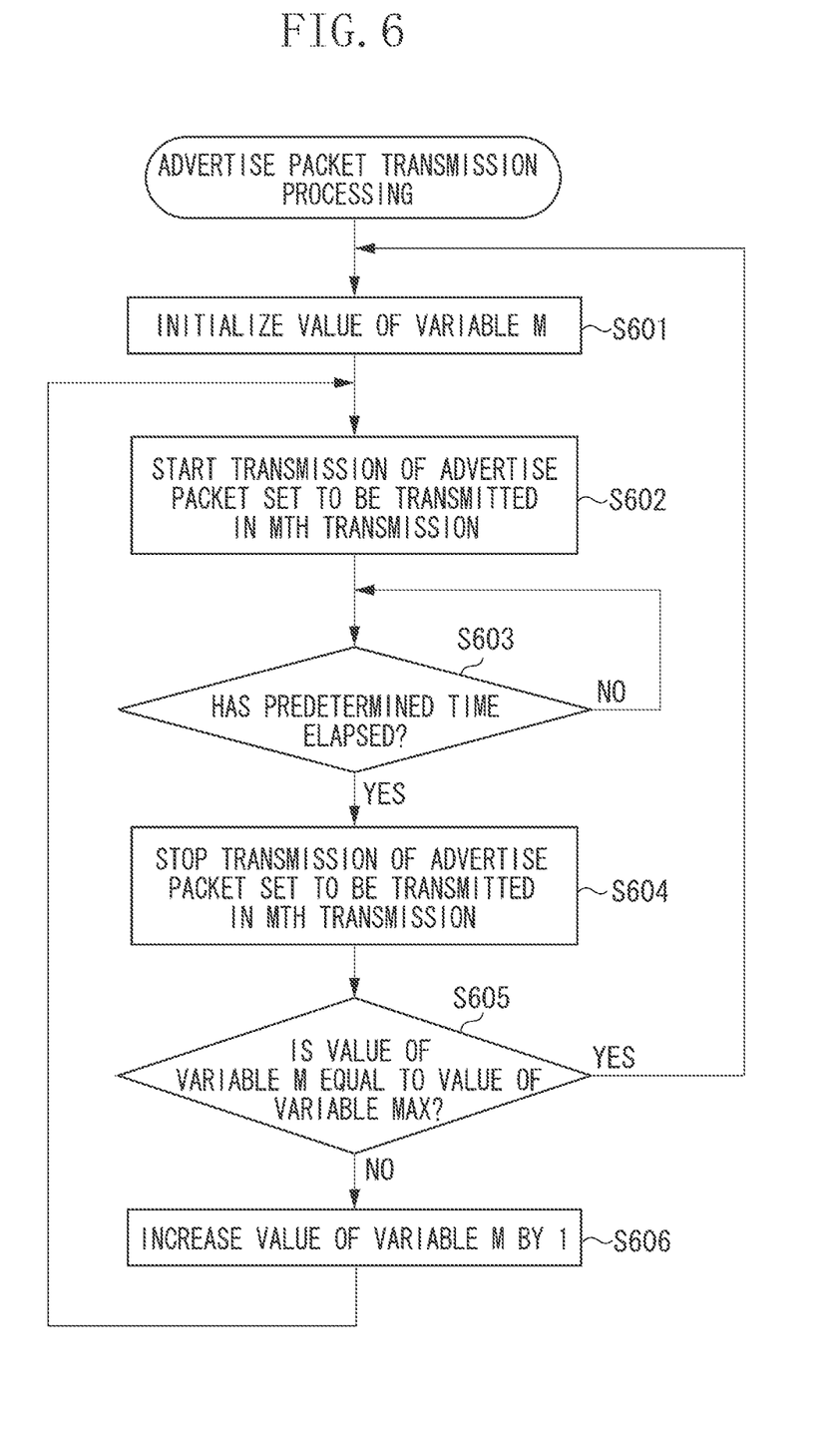
FIG. 6 is a flow chart illustrating a process which is executed by a printing apparatus.

The following describes the flow chart illustrated in FIG. 6 with reference to a specific example. For example, if iBeacon™ and Eddystone™ are selected on the setting screen 300, an advertise packet in iBeacon™ format, an advertise packet in Eddystone™ format, an advertise packet in iBeacon™ format, an advertise packet in Eddystone™ format, etc. are transmitted in this order. If Eddystone™, printing application, and custom format are selected on the setting screen 300, an advertise packet in Eddystone™ format, an advertise packet in printing application format, an advertise packet in custom format, an advertise packet in Eddystone™ format, an advertise packet in printing application format, an advertise packet in custom format, etc. are transmitted in this order.

There can be a case in which the Bluetooth® chip 208 receives a connection request from a mobile terminal while the process illustrated in the flow chart in FIG. 6 is executed, i.e., while the Bluetooth® chip 208 transmits an advertise packet. In this case, the Bluetooth® chip 208 can perform GATT communication with the mobile terminal while continuing to transmit the advertise packet, or can suspend transmission of the advertise packet and then perform GATT communication. In the case in which transmission of the advertise packet is suspended, transmission of the advertise packet is resumed when the GATT communication ends.

As described above, according to the present exemplary embodiment, the printing apparatus 100 can transmit advertise packets in a plurality of formats. A user (e.g., system administrator) can select from the plurality of formats a format of an advertise packet to be transmitted by the printing apparatus 100. For example, in the environment in which there are people who desire to use iBeacon™ and people who desire to use Eddystone™, the user can select iBeacon™ and Eddystone™ as formats of advertise packets to be transmitted.

The printing apparatus 100 according to the present exemplary embodiment, does not simultaneously transmit advertise packets in two or more formats. For example, in the case in which iBeacon™ and Eddystone™ are selected on the setting screen 300, the printing apparatus 100 does not simultaneously transmit the advertise packet in iBeacon™ format and the advertise packet in Eddystone™ format. The printing apparatus 100 first transmits the advertise packet in iBeacon™ format. Then, after the predetermined time elapses, the printing apparatus 100 stops transmission of the advertise packet in iBeacon™ format and then starts transmission of the advertise packet in Eddystone™ format.

In the present exemplary embodiment, there can be a case in which none of the formats displayed on the setting screen 300 is selected as a format of an advertise packet to be transmitted. In this case, the printing apparatus 100 does not need to transmit an advertise packet, so the supply of power to the Bluetooth® chip 208 can be stopped, and the Bluetooth® Low Energy function of the printing apparatus 100 can be disabled.

Figure 7:
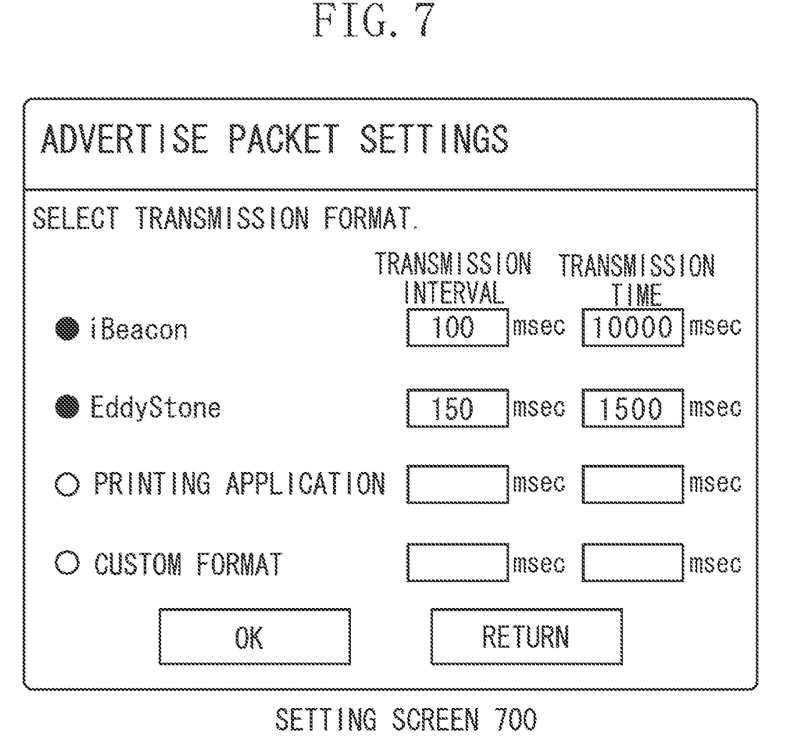
FIG. 7 illustrates a setting screen.

In the present exemplary embodiment, the advertise packets in each format are periodically transmitted at the same time interval (e.g., interval of 100 msec). In the present exemplary embodiment, the same time also elapses until the format of the advertise packet to be transmitted is switched to the next format (e.g., 1000 msec). A user can set such time intervals for each format. A setting screen 700 illustrated in FIG. 7 is a modified example of the setting screen 300 illustrated in FIG. 3. On the setting screen 700, the user can set for each of the formats the time interval (transmission interval) in the transmission of advertise packets and the time (transmission time) to elapse until the format of the advertise packet to be transmitted is switched to the next format.

The above-described exemplary embodiment provides a communication apparatus that is applicable to an environment in which advertise packets in a plurality of formats are needed.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:
1. A printing apparatus which performs a wireless communication based on Bluetooth® Low Energy, and which performs print processing based on print data received from an external apparatus, the printing apparatus comprising:
 a setting unit configured to set whether to enable a first function; and
 a wireless communication unit configured to transmit a first type of advertise packets of the Bluetooth® Low Energy, the advertise packets corresponding to a print application installable in an external apparatus, in accordance with the setting unit having set to enable the first function,
 wherein the wireless communication unit is capable of transmitting both the first type of the advertise packets and a second type of the advertisement packets of the Bluetooth® Low Energy, the second type being different from the first type, based on a setting in the printing apparatus.

2. The printing apparatus according to claim 1,
 wherein the wireless communication unit transmits the first type of the advertise packets and the second type of the advertise packets by a time division method when the wireless communication unit transmits the first type of the advertise packets and the second type of the advertise packets.

3. The printing apparatus according to claim 2,
 wherein the wireless communication unit transmits the other of the first type of the advertise packets and the second type of the advertise packets after a lapse of predetermined time from a start of transmitting one of the first type of the advertise packets and the second type of the advertise packets.

4. The printing apparatus according to claim 2,
 wherein the wireless communication unit repeats transmission of the first type of the advertise packets at first intervals and transmission of the second type of the advertise packets at second intervals.

5. The printing apparatus according to claim 4,
 wherein the first interval and the second interval are same values.

6. The printing apparatus according to claim 4,
 wherein a value of the first interval is different from a value of the second interval.

7. The printing apparatus according to claim 2,
 wherein the wireless communication unit transmits one of the first type of the advertise packets and the second type of the advertise packets a plurality of times and transmits after the transmission of the one of the first type of the advertise packets and the second type of the advertise packets, another one of the first type of the advertise packets and the second type of the advertise packets a plurality of times.

8. The printing apparatus according to claim 1, further comprising;
 a display unit configured to display a setting screen for setting whether to enable the first function,
 wherein the setting unit makes the settings by accepting a user operation via the setting screen displayed on the display unit.

9. The printing apparatus according to claim 1, wherein the first function is a function related to transmission of the advertise packets corresponding to the print application that can be installed in the external apparatus.

10. A printing apparatus which performs a wireless communication based on Bluetooth® Low Energy, the printing apparatus comprising:
 a print processing unit configured to perform print processing based on print data received from an external apparatus; and a wireless communication unit configured to transmit, by a time division method, a plurality of types of advertise packets of the Bluetooth® Low Energy that differ in format, wherein a first type of the advertise packets transmitted by the wireless communication unit are advertise packets transmitted for a print application that can be installed in an external apparatus.

11. The printing apparatus according to claim 10, wherein the wireless communication unit transmits the other of the first type of the advertise packets and a second type of the advertise packets after a lapse of predetermined time from a start of transmitting one of the first type of the advertise packets and the second type of the advertise packets.

12. The printing apparatus according to claim 10, wherein the wireless communication unit repeats transmission of the first type of the advertise packets at first intervals and transmission of the second type of the advertise packets at second intervals.

13. The printing apparatus according to claim 12, wherein the first interval and the second interval are same values.

14. The printing apparatus according to claim 12, wherein a value of the first interval is different from a value of the second interval.

15. The printing apparatus according to claim 10, wherein the wireless communication unit transmits one of the first type of the advertise packets and the second type of the advertise packets a plurality of times and transmits after the transmission of the one of the first type of the advertise packets and the second type of the advertise packets, another one of the first type of the advertise packets and the second type of the advertise packets a plurality of times.

16. A method for controlling a printing apparatus which performs a wireless communication based on Bluetooth® Low Energy, and which performs print processing based on print data received from an external apparatus, the method comprising:

setting whether to enable a first function; and transmitting a first type of an advertise packets of the Bluetooth® Low Energy, the advertise packets corresponding to a print application installable in an external apparatus, in accordance with settings to enable the first function, wherein the printing apparatus is capable of transmitting both the first type of the advertise packets and a second type of the advertisement packets of the Bluetooth® Low Energy, the second type being different from the first type, based on a setting in the printing apparatus.

17. The method according to claim 16, wherein transmitting the first type of the advertise packets and the second type of the advertise packets is performed by a time division method when the first type of the advertise packets and the second type of the advertise packets are transmitted.

18. The method according to claim 17, wherein transmitting the other of the first type of the advertise packets and the second type of the advertise packets is performed after a lapse of predetermined time from a start of transmitting one of the first type of the advertise packets and the second type of the advertise packets.

19. The method according to claim 17, wherein transmitting the first type of the advertise packets is repeated at first intervals and transmitting the second type of the advertise packets is repeated at second intervals.

20. The method according to claim 19, wherein the first interval and the second interval are same values.

21. The method according to claim 19, wherein a value of the first interval is different from a value of the second interval.

22. The method according to claim 17, wherein, one of the first type of the advertise packets and the second type of the advertise packets are transmitted a plurality of times, and after the transmission of the one of the first type of the advertise packets and the second type of the advertise packets, another one of the first type of the advertise packets and the second type of the advertise packets are transmitted a plurality of times.

23. The method according to claim 16, further comprising;

displaying a setting screen for setting whether to enable the first function, wherein making the settings by accepting a user operation via the setting screen.

24. The method according to claim 16, wherein the first function is a function related to transmission of the advertise packets corresponding to the print application that can be installed in the external apparatus.

25. A non-transitory computer-readable storage medium storing computer executable instructions for causing a computer to execute a method for controlling a printing apparatus which performs a wireless communication based on Bluetooth® Low Energy, the method comprising:

performing print processing based on print data received from an external apparatus; and transmitting, by a time division method, a plurality of types of advertise packets of the Bluetooth® Low Energy that differ in format, wherein a first type of the advertise packets transmitted by the wireless communication unit are advertise packets transmitted for a print application that can be installed in an external apparatus.

26. The non-transitory computer-readable storage medium according to claim 25, wherein transmitting the other of a first type of the advertise packets and a second type of the advertise packets is performed after a lapse of predetermined time from a start of transmitting one of the first type of the advertise packets and the second type of the advertise packets.

27. The non-transitory computer-readable storage medium according to claim 25, wherein transmitting the first type of the advertise packets is repeated at first intervals and transmitting the second type of the advertise packets is repeated at second interval.

28. The non-transitory computer-readable storage medium according to claim 27, wherein the first interval and the second interval are same values.

29. The non-transitory computer-readable storage medium according to claim 27, wherein a value of the first interval is different from a value of the second interval.

30. The non-transitory computer-readable storage medium according to claim 25, wherein, one of the first type of the advertise packets and the second type of the advertise packets are transmitted a plurality of times, and after the transmission of the one of the first type of the advertise packets and the second type of the advertise packets, another one of the first type of the advertise packets and the second type of the advertise packets a plurality of times are transmitted.

31. The non-transitory computer-readable storage medium according to claim 25, wherein the first function is a function related to transmission of the advertise packets corresponding to the print application that can be installed in the external apparatus.

\* \* \* \* \*